United States Patent [19]
Golestan et al.

[11] Patent Number: 5,383,489
[45] Date of Patent: Jan. 24, 1995

[54] FLOW CONTROL VALVE WITH ENHANCED FLOW CONTROL PISTON

[75] Inventors: Farhad Golestan, Dallas; John M. Trantham, Irving, both of Tex.

[73] Assignee: Flow Design, Inc., Dallas, Tex.

[21] Appl. No.: 143,308

[22] Filed: Oct. 26, 1993

[51] Int. Cl.⁶ .................................................. G05D 7/01
[52] U.S. Cl. ........................................................ 137/504
[58] Field of Search ............................................ 137/504

[56] References Cited

U.S. PATENT DOCUMENTS

| | | | |
|---|---|---|---|
| 3,015,341 | 1/1962 | Hedland et al. | 137/493 |
| 3,130,747 | 4/1964 | Benaway | 137/504 |
| 3,131,716 | 5/1964 | Griswold et al. | 137/503 |
| 3,339,580 | 9/1967 | Cutler et al. | 137/504 |
| 3,599,667 | 8/1971 | Kaser | 137/504 X |
| 3,752,183 | 8/1973 | Griswold | 137/504 |
| 3,752,184 | 8/1973 | Griswold | 137/504 |
| 3,756,272 | 9/1973 | Hammond | 137/498 |
| 4,766,928 | 8/1988 | Golestaneh | 137/504 X |
| 5,054,516 | 10/1991 | Okerblom | 137/504 |
| 5,174,330 | 12/1992 | Golestan et al. | 137/504 |

*Primary Examiner*—Robert G. Nilson
*Attorney, Agent, or Firm*—Baker & Botts

[57] ABSTRACT

A flow control valve (10) is provided including a valve body (20) and a piston (16). The valve body (20) has extending therethrough a longitudinal bore (18) defining a first flow passage (32). The piston (16) is slidably disposed within the bore (18) to vary the flow area of a fluid flow through the control valve (10). The piston (16) contains a second flow passage (28) defined by a side wall (68) and an end wall (70). The side wall (68) has at least one longitudinal flow channel (24) with a first orifice (26) extending therethrough. The piston (16) preferably slides within the longitudinal bore (18) to vary the flow area of the first flow passage (32) such that the fluid flow through the control valve (10) is substantially constant over a selected range of pressure differentials across the control valve (10).

23 Claims, 1 Drawing Sheet

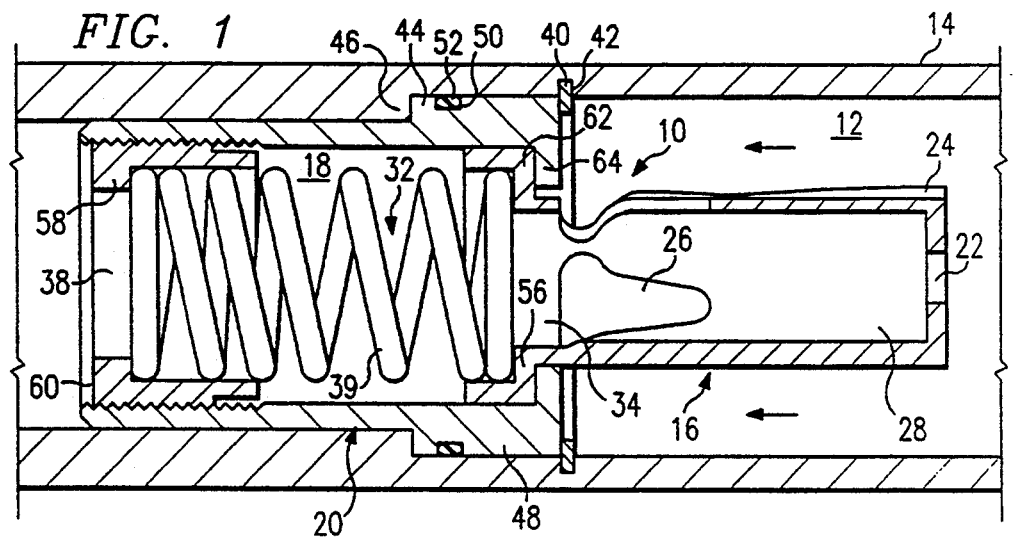
FIG. 1
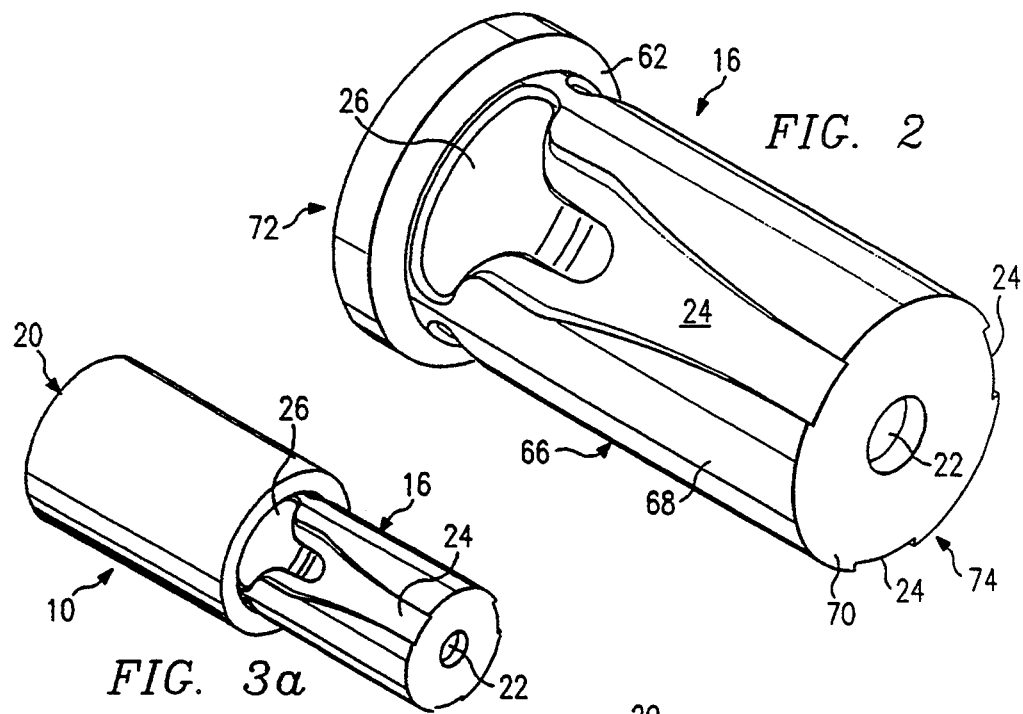
FIG. 2
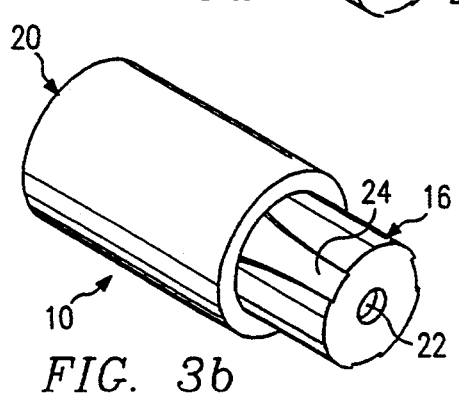
FIG. 3a
FIG. 3b
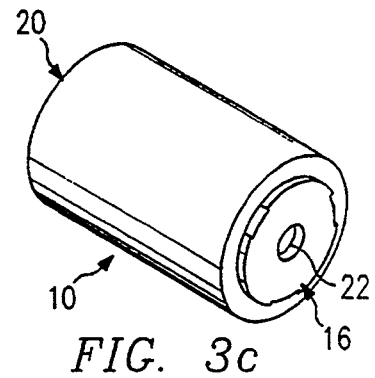
FIG. 3c

FLOW CONTROL VALVE WITH ENHANCED FLOW CONTROL PISTON

TECHNICAL FIELD OF THE INVENTION

The present invention pertains in general to flow control valves and more particularly to an automatic flow control valve having an enhanced flow control piston.

BACKGROUND OF THE INVENTION

Constant flow control valves have numerous applications in piping networks. For example, in a building air conditioning and heating system, water or other liquid at an appropriate control temperature maybe pumped from a central station through a piping network to various heat exchanger units located throughout the building. Some of these heat exchanger units are located relatively close to the central station while others are located much farther away. The fluid pressure applied across inputs and outputs of the respective heat exchanger units varies widely because of factors such as frictional losses inherent in the flow of the liquid through the piping network and the distances the liquid must travel from the central station.

The flow rate in each branch of the network is a direct function of the pressure drop existing across that branch. Two contributors to the existence and magnitude of the pressure drop are line friction and equipment pressure drop. The actual pressure drop in one branch is often different from the original desired or, designed value, leading to a flow rate in that branch which is different from the desired flow rate. Changes from the desired flow rate in one branch will influence the flow rate in other branches. To obtain the desired flow rate in the various branches of such a network, the network should be hydraulically balanced.

Hydraulic balancing often involves adding additional pressure to one or more branches within the system, a measure which may create wasteful pressure drops therein. Pumps are frequently oversized to provide the additional pressure required to balance the network. Therefore, these pumps are frequently operated at flow rates and pressures other than their optimum performance conditions which results in wasteful energy consumption.

Constant flow control valves help to alleviate the need for hydraulic balancing. Examples of such control valves are disclosed in U.S. Pat. No. 4,766,928 issued to Golestaneh and U.S. Pat. No. 5,174,330 issued to Golestan et al. Both references disclose a constant flow rate control valve including a movable piston having a plurality of side ports and an orifice on an end wall of the piston. Pressure differential across the valve moves the piston against a resilient spring to expose an appropriate portion of the side port area to maintain a constant flow rate at that pressure differential. There is always a minimum pressure differential required to overcome frictional losses and to establish the desired flow rate for the Golestaneh, Golestan et al. and other prior control valves. For some systems, particularly those with long piping runs, even this minimum pressure drop may not be attainable. Another problem with prior control valves is that they may cause turbulence as the fluid passes through the regulating orifice; this turbulence may reduce the energy of the fluid flow. Still another problem with prior control valves is that their parts and orifices may become clogged with fluid borne particles or have deformities which may alter the respective control valve flow characteristics. Furthermore, prior control valves may have parts with critical dimensions which may require the valve to be expensively manufactured by high precision machinery.

SUMMARY OF THE INVENTION

In accordance with the present invention, the disadvantages and problems associated with previous flow control valves for regulating fluid flow rate have been substantially reduced or eliminated. The present invention provides a flow control valve including a valve body and a piston. The valve body has a longitudinal bore extending therethrough to define a first flow passage. The piston is slidably disposed within the bore to vary the fluid flow area of the first flow passage through the control valve. The piston contains a second flow passage defined by a side wall and an end wall. The side wall has at least one longitudinal flow channel with a first side orifice extending therethrough. The piston preferably slides within the longitudinal bore to vary the flow area of the first flow passage such that the fluid flow through the valve is substantially constant over a selected range of pressure differentials across the control valve.

One embodiment of the present invention includes a control valve having a valve body with a longitudinal bore extending therethrough and a piston slidably disposed in the longitudinal bore. A plurality of orifices are formed in the piston to allow fluid flow through the longitudinal bore. A plurality of longitudinal flow channels are also formed in the exterior of the piston and communicate with an associated orifice. An annular shoulder is formed on the valve body adjacent to the exterior of the piston whereby the annular shoulder cooperates with the orifices and the longitudinal flow channels to regulates fluid flow through the longitudinal bore.

A first technical advantage of the present invention is that the amount of turbulence introduced into the fluid flow is substantially reduced. Reduced turbulence provides for a reduced energy loss in the flow.

A second technical advantage of the present invention is that it provides for a lower pressure differential across the flow control valve for a given flow rate therethrough.

A third technical advantage of the present invention is that it has a reduced tendency to clog with particles carried by the fluid and is more tolerant of clogs or deformities which may effect the fluid flow.

A fourth technical advantage of the present invention is that it may be manufactured by standard precision tooling.

A fifth technical advantage of the present invention is that each longitudinal flow channel and its associated side orifice cooperate to define a flow passage which is substantially parallel with the fluid flow through the control valve.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a drawing in longitudinal section with portions broken away of a flow control valve incorporating the present invention;

FIG. 2 is an isometric view of a flow control piston used with the flow control valve of FIG. 1;

FIG. 3a is an isometric view of the flow control valve of FIG. 1 with the flow control piston in a low differential pressure control position;

FIG. 3b is an isometric view of the flow control valve of FIG. 1 with the flow control piston in an intermediate differential pressure control position; and FIG. 3c is an isometric view of the flow control valve of FIG. 1 with the flow control piston in a high differential pressure control position.

DETAILED DESCRIPTION OF THE INVENTION

The preferred embodiment of the present invention and its advantages are best understood by referring to FIGS. 1–3c of the drawings, like numerals being used for like and corresponding parts of the various drawings.

Referring to FIG. 1, a flow control valve 10 is shown disposed within a longitudinal bore 12 of a conduit or housing 14. The general direction of the fluid flow in longitudinal bore 12 is shown by the arrows to be from right to left. Flow control valve 10 includes a flow control piston 16 slidably disposed within a longitudinal bore 18 of a valve body 20. Flow control piston 16 has a fixed end orifice or first opening 22 and at least one flow channel or slot 24. Each channel 24 has disposed therein a side port or orifice 26. The interior of piston 16 defines a fluid passage 28 in communication with orifices 22 and 26. Bore 18 provides a fluid passage 32 which receives at an up stream or third opening 34 fluid flowing through orifice 22 and through orifices 26 via channels 24 (i.e., receives fluid flowing through passage 28). The fluid then exits a fluid passage 32 disposed within bore 18, via down stream or fourth opening 38.

As the fluid flows through bores 12 and 18, a pressure differential is formed across flow control valve 10. A biasing means or spring 39 responds to this differential pressure by regulating the longitudinal position of piston 16 within bore 18. By adjusting this position, spring 39 varies the total flow area of piston 16 (the sum of the effective flow areas of end orifice 22, side orifices 26, and channels 24) to maintain a substantially constant flow rate through flow control valve 10.

As discussed in more detail below, channels 24 significantly reduce the turbulence generated by flow control valve 10 as the fluid flows through side orifices 26 into passageways 28 and 32. Additionally, the tapered shape of channels 24 makes flow control valve 10 much more clog tolerant and resistant then prior flow control valves. Furthermore, irregularities of channel 24 dimensions have less affect on the flow control characteristics than do irregularities in the dimensions of prior orifices.

For example, as orifices 26 fully retract past annular shoulder 64 into bore 18 (FIGS. 3b and 3c), the flow area of control valve 10 reduces to that of channels 24 (channel width x depth) at the external edge of annular shoulder 64. (The width and depth of channels 24 are preferably large enough to be easily milled by standard tooling machines.) Any irregularity (i.e., bumps, pits, etc.) along the walls or bottoms of channels 24 affect the flow characteristics of valve 10 only when the portion of channel 24 containing the irregularity is positioned adjacent to annular shoulder 64. Fluid simply bypasses the irregularity when the irregular channel portion is positioned either upstream or downstream from annular shoulder 64.

Still referring to FIG. 1, a retainer or snap ring 40 is provided for releasably anchoring flow control valve 10 into longitudinal bore 12 in a predetermined position relative to housing 14. Housing 14 may then be coupled on each end to a pipe or conduit (not shown) through which the fluid flows. In other embodiments, however, flow control valve 10 may be installed directly into a conduit without a housing. Retainer ring 40 may be installed in a groove 42 formed in the interior wall of housing 14. Once installed, retainer ring 40 engages the up stream end of valve body 20 to limit up stream movement of valve body 20.

Similarly, a shoulder 44 on the exterior of valve body 20 engages a shoulder 46 on the interior of housing 14 to limit the movement of flow control valve 10 in a down stream direction. Thus, an exterior portion 48 of valve body 20 is anchored between retainer ring 40 and shoulder 46.

Groove 50 is preferably formed around exterior portion 48 of valve body 20 for holding seal means or O-ring 52. Seal means 52 forms a fluid barrier with the adjacent surfaces of valve body 20 and housing 14 between the up stream and down stream ends of flow control valve 10. Thus, seal means 52 directs all fluid flow within housing 12 through flow control valve 10.

Spring 39 is housed within bore 18 for urging flow control piston 16 in an up stream direction toward a fully extended position. One end of spring 39 is seated against an interior shoulder 56 formed at the down stream end of piston 16. The other end of spring 39 is seated against a shoulder 58 of a spring retainer 60. Exterior shoulder 62 of piston 16 engages annular shoulder 64 of valve body 20 to limit the movement of piston 16 in the up stream direction.

The end of bore 18 adjacent down stream opening 38 is threaded to receive spring retainer 60, which has threads cut along a portion of its exterior. Retainer 60 is rotatable within bore 18 to vary the compression of spring 39. Varying the compression of spring 39 "fine tunes" the designed flow rate and the selected range of pressure differentials over which flow control valve 10 maintains a substantially constant flow rate substantially equal to the designed flow rate (the selected range). Typically, this fine tuning is done during the manufacturing process to bring flow control valve 10 to within desired tolerances for flow rate regulation.

Orifices 22 and 26, channels 24, annular shoulder 64 and spring 39 cooperate to maintain a substantially constant rate of fluid flow through passages 28 and 32 over the selected range of pressure differentials across flow control valve 10. A graph of flow rate versus pressure differential for a prior flow control valve is shown in U.S. Pat. No. 5,174,330, issued to Golestaneh et al. on Dec. 29, 1992, which is hereby incorporated by reference herein for all purposes.

In the present invention, channels 24 and their associated side orifices 26 cooperate to lower the minimum flow rate attainable for a given differential pressure by reducing turbulence in the fluid flow. Fluid flow through each channel 24 and its associated orifice 26 is essentially parallel with fluid flow through orifice 22, passageway 28 and the combined fluid flow in passageway 32.

Referring to FIG. 2, flow control piston 16 is shown in more detail. Piston 16 is formed from a generally hollow cylinder 66 having a generally cylindrical side wall 68 and an up stream end plate 70. Cylinder 66 defines longitudinal bore 18 and has a down stream end 72 with an enlarged diameter forming shoulders 56 (FIG. 1) and 62. Cylinder 66 also has an up stream end 74 with a diameter smaller than that of down stream end 72. End opening 22 is formed in the center of plate 70 and has an appropriate diameter for providing the predetermined flow characteristics for which flow control valve 10 is designed.

At least one flow channel 24 is formed along the exterior of the side wall 68; each flow channel 24 longitudinally extends from down stream end 72 to up stream end 74. In the embodiment represented by FIGS. 1–3c, piston 16 is shown having three substantially identical channels 24 which are symmetrically spaced around the exterior of side wall 68. However, other embodiments of piston 16 may have more or fewer channels 24, which may or may not be symmetrically spaced, as the desired flow rate design dictates. Also, channels 24 are shown as having a varying depth throughout and a bottom which generally follows the cylindrical contour of side wall 68. However, other embodiments may have channels of substantially constant depth or bottoms of varying contour to alter the flow characteristics of piston 16.

The width of each channel 24 is relatively narrow at the end adjacent to up stream end 74 as opposed to the end adjacent to down stream end 72. In between its two ends, the width of each channel 24 tapers from the up stream width to the down stream width. Because the flow area of each channel 24 is substantially perpendicular to the fluid flow (i.e., parallel to a channel 24 cross-section as viewed from up stream end 74), this flow area also tapers in a down stream-to-up stream direction.

The flow areas of side orifices 26, one of which is disposed at the down stream end of each channel 24, are also shaped to provide a constant flow rate through passages 28 and 32 when piston 16 is longitudinally moved with respect to annular shoulder 64, as discussed below.

The dimensions (shapes) of side orifices 26, the dimensions of channels 24 (taper, depth and end widths) and length of piston 16 depend upon the predetermined flow control range and designed flow rate of flow control valve 10. These dimensions and this length are respectively calculated using well known mathematical formulas which describe fluid flow as a function of pressure differential. In this embodiment, orifices 26 have a generally bell-shaped configuration with a flat end adjacent to down stream side 72, two outwardly curved portions extending from the flat end toward up stream end 74, and two parabolic side portions which respectively extend from the two outwardly curved portions toward up stream end 74. U.S. Pat. No. 5,174,330, which was previously incorporated by reference herein, describes other useful side orifice shapes as well as specific mathematical methods for calculating these shapes.

Referring generally to FIGS. 3a–c, the operation of flow control valve 10 is now discussed. In general, a first portion of a fluid flows through end orifice 22 into passageways 28 and 32 (FIG. 1) and out of down stream opening 38. A second portion of the fluid flows into the flow area of each channel 24, through the flow area of each respective side orifice 26, into fluid passages 28 and 32 and out through opening 38. The flow area of each channel 24 is the largest channel area (in a plane perpendicular to the fluid flow) exposed on the upstream side of annular shoulder 64. Likewise, the flow area of each side port 26 is the side port area exposed on the upstream side of annular shoulder 64. That is, annular shoulder 64 cooperates with exterior 68 of piston 16 to force virtually all of the fluid to flow through end orifice 22 and the flow areas of side orifices 26 and channels 24.

Referring to FIG. 3a, when the pressure differential across flow control valve 10 is at or below the minimum pressure required to enter the selected range, spring 39 urges piston 16 to a fully extended (i.e., low flow rate) position with respect to bore 18. In this fully extended position, the maximum flow areas of orifices 22, 26 and channels 24 are available for fluid flow. As the pressure differential falls below the minimum, the flow rate will fall too; shoulders 62 and 64 prevent piston 16 from extending further to increase the total effective flow area and compensate for the pressure drop.

Still referring to FIG. 3a, as the pressure differential increases beyond the required minimum pressure, piston 16 is forced to retract into bore 18 until the force exerted on piston 16 by spring 39 in the up stream direction equals that exerted by the fluid flow in the down stream direction. As piston 16 retracts, the effective flow areas of side orifices 26 are reduced. Thus, when the flow force equals the spring force, piston 16 is in a partially extended or intermediate flow control position where the total effective flow area of flow control valve 10 is such that a substantially constant flow rate through control valve 10 is maintained.

Referring to FIG. 3b, as the pressure differential across flow control valve 10 increases further, the effective flow area of side orifices 26 is reduced to zero, i.e., side orifices 26 are fully retracted within bore 18. Because the flow areas of channels 24 lie in a plane substantially perpendicular to the fluid flow (as opposed to the flow areas of side orifices 26 which lie in a plane substantially parallel to the fluid flow), the effective flow areas of channels 24 in the present embodiment are not reduced until their tapered portions retract some distance into bore 18.

This retraction point occurs in the present embodiment of flow control valve 10 at approximately the same point that side orifices 26 become fully retracted within bore 18. Thus, as piston 16 is retracted beyond this point, the change in the total effective flow area (required to keep the flow rate constant) is attributable primarily to a change in the effective flow areas of channels 24. That is, for the present embodiment, a point exists in the range of intermediate flow control positions of piston 16 (this range is bounded by the full extended and full retracted positions) where the change in total effective flow area alternates from being primarily attributable to a change in the effective flow areas of side orifices 26 to being primarily attributable to a change in the effective flow areas of channels 24. The location of this changeover point along piston 16 can be adjusted in other embodiments to provide different flow characteristics. Also, as shown in FIG. 2, the tapered portion of channels 24 overlap orifices 26 to form a region where the change in the total effective flow area is significantly attributable to changes in the effective flow areas of both orifices 26 and channels 24.

Referring to FIG. 3c, as the pressure differential reaches the maximum pressure of the selected range, piston 16 is fully retracted (i.e., in a high flow position) within bore 18; the total effective flow area is reduced to a minimum, although there is still fluid flow into end orifice 22 and channels 24. As the pressure differential increases beyond the maximum, the flow rate will increase, because piston 16 may retract no further to vary the flow area to maintain a substantially constant flow rate. It is understood that in most applications, flow control valve 10 will have a selected range of pressure differentials which is large enough to encompass expected maximum and minimum pressure differentials within the system branch into which it is installed.

Channels 24 provide numerous advantages over prior control valves. For example, channels 24 reduce the amount of turbulence generated at side orifices 26 by providing a flow path into side orifices 26 which is substantially parallel to the natural flow path through the conduit (not shown) and bore 12. That is, as fluid flows from the narrow end of a channel 24 to a side orifice 26, the fluid is not required to sharply turn into orifice 26; channels 24 allows the fluid to flow into orifice 26 at a gradual angle as opposed to the substantially perpendicular angle of the prior art. The fluid flow is, therefore, deprived of less kinetic energy than it would be if required to enter side orifice 26 at a sharp angle. That is, because the fluid enters orifice 26 at a gradual angle, turbulence and, hence, loss of kinetic energy, are reduced.

A reduction in turbulence provides at least two advantages. First, since less kinetic energy is lost, less of a pressure differential across control valve 10 is required to generate a predetermined fluid flow rate therethrough. Thus, the minimum pressure differential of the selected range is reduced. A second advantage is a significant reduction in the noise generated as the fluid flows through control valve 10.

Another advantage provided by channels 24 is that their tapered design generates a venturi-like effect on the fluid flow through control valve 10. As is well known, the narrow portions of channels 24 force the fluid flow to experience a pressure drop and velocity increase within these narrow portions. As channels 24 widen, the fluid velocity decreases and the pressure increases to a down stream level which is substantially closer to the original upstream pressure than is attainable with any prior control valves. That is, the tapered channel design further reduces the minimum pressure differential across valve 10 (beyond the reduction attributable to reduced turbulence) required for a given flow rate.

Yet another advantage provided by the tapered design of channels 24 is a reduction in the likelihood that a fluid borne particle will lodge itself within a channel 24. Because a channel 24 widens toward its down stream end, a fluid borne particle is typically forced toward a wider portion, not a narrower portion, until the particle passes through a respective side orifice 26. Even if a particle does become wedged in a channel 24, the particle may not significantly effect the flow rate; the fluid will typically flow over the wedged particle and back into channels 24. (The same is true for a deformity in a channel 24; the fluid will simply flow around the deformity and back into the non-deformed down stream portion of the channel.) Also, a particle may wedge between valve body 20 and a channel 24 when piston 16 is in an intermediate flow control position. However, control valve 10 will typically purge itself of the particle when piston 16 returns to a substantially fully extended position (during times when there is relatively little or no fluid flow), whereby the particle will typically dislodge and exit through a respective orifice 26.

Still another advantage is that because of the flow control provided by channels 24, the smallest dimensions of side orifices 26 are typically larger than those of prior side orifices for a given flow rate design; these larger dimensions and the dimensions of channels 24 are more easily tooled with standard precision machines. For example, the depth and width of channels 24 define their flow area. Since the entire flow area of a flow channel 24 is located at annular shoulder 64, rather than extending along the entire sidewall 68 of piston 16, extremely narrow ports are not required as with prior pistons.

A further advantage provided by channels 24 is that they typically extend the entire length of piston 16. This extension provides for a variable effective flow area along the entire length of piston 16. Prior pistons have only side ports which do not extend the length of the piston. Thus, prior pistons provide for a variable effective flow area only along the portion of the piston integral with the side ports.

Although the present invention and its advantages have been described in detail, it should be understood that various changes, substitutions and alterations can be made therein without departing from the spirit and scope of the invention as defined by the appended claims. For example, channels 24 may have a constant width (non-tapered) and still reduce turbulence although resistance to clogging may be inferior to the clog resistance of the disclosed embodiment.

What is claimed is:

1. A flow control valve comprising:
   a valve body having a longitudinal bore with a first flow passage extending therethrough;
   a piston slidably disposed within the bore for varying the fluid flow area of the first flow passage through the control valve, the piston having a side wall and an end wall defining a second flow passage;
   at least one longitudinal flow channel formed in the side wall having an up stream end and a down stream end, the up stream end adjacent to the end wall and an associated orifice extending through the side wall intermediate the ends thereof, the longitudinal flow channel for allowing fluid communication with the associated orifice;
   an annular shoulder formed on the valve body adjacent to the exterior of the piston whereby movement of the piston in response to changes in differential pressure across the valve body provides a substantially constant fluid flow over a selected range of pressure differentials;
   the longitudinal flow channel having a width and a depth formed along the exterior of the side wall; and
   the longitudinal flow channel having a varying depth.

2. The valve of claim 1 wherein the end wall comprises:
   a second orifice extending therethrough to allow fluid flow into the second flow passage; and
   the second flow passage communicating fluid from the second orifice with fluid entering the first flow passage from the first orifice.

3. The valve of claim 1 further comprising a biasing member for urging the piston against the fluid flow.

4. The valve of claim 3 wherein the biasing member comprises a spring.

5. The valve of claim 3 further comprising a shoulder formed on the piston for engaging the annular shoulder of the valve body to limit the upstream movement of the piston.

6. The valve of claim 5 further comprising a spring retainer attached to the valve body for retaining the spring within the bore, the retainer moveable relative to the valve body to adjust the force exerted by the spring on the piston.

7. The valve of claim 1 further comprising at least one orifice located at a downstream end of the channel.

8. The valve of claim 1 further comprising the piston slidably disposed within the bore to vary the flow area of at least one orifice such that the fluid flow through the control valve is substantially constant over the selected range of pressure differentials.

9. A flow control valve comprising:
   a valve body having a longitudinal bore with a first flow passage extending therethrough;
   a piston slidably disposed within the bore for varying the fluid flow area of the first flow passage through the control valve, the piston having a side wall and an end wall defining a second flow passage;
   three longitudinal flow channels formed in the sidewall, each channel having an associated orifice extending through the side wall intermediate the ends thereof, each longitudinal flow channel for allowing fluid communication with the orifice associated therewith; and
   an annular shoulder formed on the valve body adjacent to the exterior of the piston whereby movement of the piston in response to changes in differential pressure across the valve body provides a substantially constant fluid flow area selected range of pressure differentials.

10. The valve of claim 9 wherein each channel has a varying depth.

11. A flow control valve comprising:
   a valve body having a longitudinal bore with a first flow passage extending therethrough;
   a piston slidably disposed within the bore for varying the fluid flow area of the first flow passage through the control valve, the piston having a side wall and an end wall defining a second flow passage;
   at least one longitudinal flow channel formed in the sidewall, the channel having an associated orifice extending through the side wall intermediate the ends thereof, the longitudinal flow channel for allowing fluid communication with the associated orifice;
   on annular shoulder formed on the valve body adjacent to the exterior of the piston whereby movement of the piston in response to changes in differential pressure across the valve body provides a substantially constant fluid flow over a selected range of pressure differentials; and
   the longitudinal flow channel having an up stream end having an up stream width and a down stream end having a down stream width, the up stream width narrower than the down stream width.

12. The valve of claim 11 further comprising the channel having a width which longitudinally tapers from the down stream width to the up stream width.

13. The valve of claim 12 further comprising the piston slidably disposed within the bore to vary the flow area of the channel such that the fluid flow through the control valve is substantially constant over the selected range.

14. A flow control valve for maintaining a substantially constant fluid flow therethrough, the control valve comprising:
   a valve body having a longitudinal bore with a first fluid passage extending therethrough;
   a piston having a generally cylindrical configuration defining a second fluid passage extending therethrough, the piston including an end wall and at least one longitudinal flow channel formed in the exterior of the piston;
   the longitudinal flow channel having an up stream end and a down stream end, the width of the up stream end narrower than the width of the down stream end;
   a first orifice extending through the exterior of the piston adjacent to the downstream end of the longitudinal flow channel;
   the end wall having a second orifice extending therethrough and communicating fluid with the second fluid passage;
   a biasing member disposed within the longitudinal bore for resiliently urging the piston against the fluid flow;
   the longitudinal flow channel and the first orifice communicating fluid with the first fluid passage and the second orifice and the second fluid passage communicating fluid with the first fluid passage; and
   the piston slidably disposed in the bore for cooperation with the biasing member to vary the flow area of the first orifice such that the fluid flow is substantially constant over a selected range of pressure differentials across the control valve.

15. The valve of claim 14 further comprising:
   the channel having a width longitudinally tapering from the down stream width to the up stream width; and
   the piston slidably disposed within the bore to vary the flow area of the channel in response to pressure changes across the control valve such that the fluid flow remains substantially constant over the selected range of pressure differentials.

16. The valve of claim 14 further comprising the channel having a substantially constant depth.

17. The valve of claim 14 further comprising the channel having a bottom of substantially the same contour as the exterior of the piston.

18. The valve of claim 14 wherein the piston further comprises three substantially identical longitudinal flow channels formed in the exterior of the piston.

19. The valve of claim 14 wherein the valve body further comprises:
   an annular shoulder formed within the longitudinal bore; and
   the piston further comprises a shoulder for cooperating with the annular shoulder to restrict the up stream movement of the piston.

20. The valve of claim 14 wherein the channel is formed with a varying depth.

21. A flow control valve for automatically regulating a fluid flow through a conduit, the control valve comprising:
   a valve body having interior and exterior walls, the interior wall defining a longitudinal bore having a first flow passage extending therethrough, the exterior wall defining a first shoulder for engaging the conduit to retain the control valve in a fixed position within the conduit;

a piston having a side wall and an end wall for defining a second flow passage;

the side wall having formed therein at least one longitudinal flow channel;

the flow channel having an up stream end and a down stream end with a first orifice extending through the side wall, the width of the channel longitudinally tapering from a down stream width to an up stream width;

the end wall having a second orifice extending therethrough;

wherein a fluid flows through the first orifice via the channel and through the second orifice into the first flow passage via the second flow passage;

a spring disposed within the bore for resiliently urging the piston against the fluid flow, wherein the valve body has an annular shoulder and the piston has a second shoulder for cooperating with the annular shoulder to limit the up stream movement of the piston; and the piston slidably disposed in the bore for varying the flow areas of the first orifice and the channel such that the fluid flow through the control valve is substantially constant over a selected range of pressure differentials across the control valve.

22. The valve assembly of claim 21 wherein the piston further comprises three essentially identical longitudinal flow channels positioned along the exterior of the piston.

23. The valve assembly of claim 21 further comprising:

the piston having a generally cylindrical shape;

the longitudinal flow channel formed with a substantially constant depth; and a bottom portion of the channel formed with substantially the same cylindrical contour as the piston exterior.

* * * * *

UNITED STATES PATENT AND TRADEMARK OFFICE
CERTIFICATE OF CORRECTION

PATENT NO. : 5,383,489
DATED : January 24, 1995
INVENTOR(S) : Golestan

It is certified that error appears in the above-indentified patent and that said Letters Patent is hereby corrected as shown below:

Column 4, line 53, after "issued to", delete "Golestaneh" and insert -- Golestan --.
Column 8, line 56, after "wall", insert -- further --.
Column 9, line 1, after "limit the", delete "upstream" and insert -- up stream --.
Column 9, line 9, after "located at a", delete "downstream" and insert -- down stream --.
Column 9, line 19, after "flow", delete "area" and insert "over a --;
Column 9, line 50, before "annular", delete "on" and insert -- an --.
Column 10, line 16, after "the" delete "downstream," and insert -- down stream --.

Signed and Sealed this

Twenty-sixth Day of September, 1995

Attest:

BRUCE LEHMAN

*Attesting Officer*  *Commissioner of Patents and Trademarks*